No. 11,751. Reissued June 20, 1899.
W. S. & C. I. CORBY.
MACHINE FOR WORKING AND SHAPING DOUGH.
(Application filed Mar. 30, 1898.)
2 Sheets—Sheet 1.
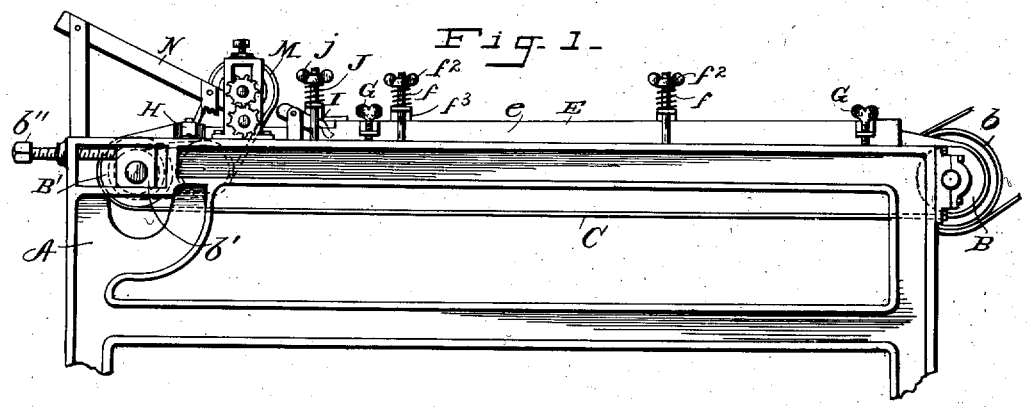
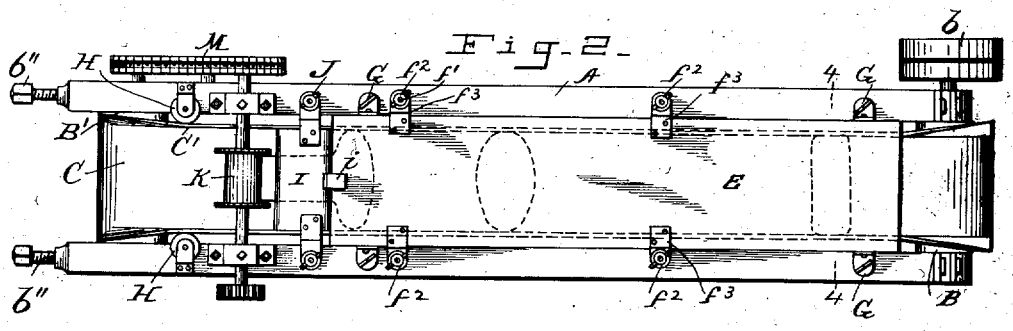
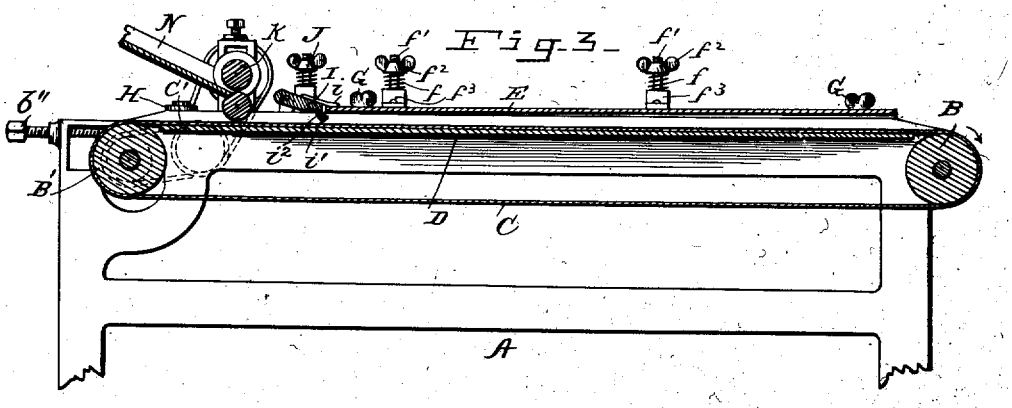
Witnesses
H. R. Edelen.
Geo. T. May, Jr.
Inventors
William S. Corby and
Charles I. Corby
By J. S. Barker and
H. A. Bliss their Attys.

No. 11,751. Reissued June 20, 1899.

W. S. & C. I. CORBY.

MACHINE FOR WORKING AND SHAPING DOUGH.

(Application filed Mar. 30, 1898.)

2 Sheets—Sheet 2.

Witnesses
W. R. Edelen.
Geo. T. May, Jr.

Inventors
William S. Corby and
Charles I. Corby
By J. S. Barker and
R. N. Bliss, their Attys.

UNITED STATES PATENT OFFICE.

WILLIAM S. CORBY AND CHARLES I. CORBY, OF WASHINGTON, DISTRICT OF COLUMBIA, ASSIGNORS OF ONE-THIRD TO THEODORE J. MAYER, OF SAME PLACE.

MACHINE FOR WORKING AND SHAPING DOUGH.

SPECIFICATION forming part of Reissued Letters Patent No. 11,751, dated June 20, 1899.

Original No. 590,133, dated September 14, 1897. Application for reissue filed March 30, 1898. Serial No. 675,821.

*To all whom it may concern:*

Be it known that we, WILLIAM S. CORBY and CHARLES I. CORBY, citizens of the United States, residing at Washington, in the District of Columbia, have invented certain new and useful Improvements in Machines for Working and Shaping Dough, of which the following is a specification.

In the making of bread the dough after acquiring the proper degree of lightness is separated into small masses, which are kneaded and shaped into loaves which are subsequently baked. This kneading and shaping or molding operation is ordinarily done by hand, and is for the purpose of giving to the dough a certain uniform consistency or quality of texture, and at the same time giving to the dough masses such shapes as will produce loaves of the proper shape and appearance.

It is the object of our invention to produce a machine or apparatus by which the dough may be worked or kneaded and shaped in a uniform and rapid and thorough manner and by which results equal to handwork may be accomplished; and our invention consists of apparatus or machinery for accomplishing these objects.

In order that our invention may be understood, we have illustrated certain embodiments thereof in the accompanying drawings, in which—

Figure 4:
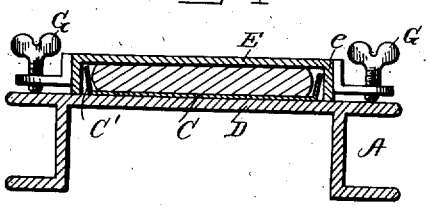
Figure 5:
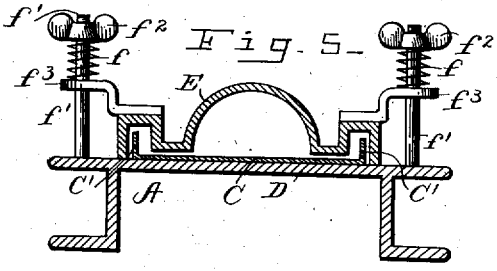
Figure 6:
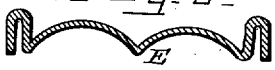
Figure 7:
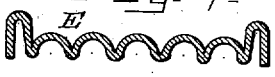
Figure 11:
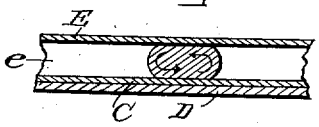
Figure 12:
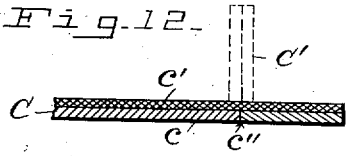

Figure 1 is a side view of one of the preferred forms of our invention. Fig. 2 is a top plan view of the same. Fig. 3 is a central longitudinal section. Fig. 4 is a transverse section taken on the line 4 4 of Fig. 2. Figs. 5, 6, and 7 are detail cross-sectional views illustrating different forms of our invention. Figs. 8, 9, 10, and 11 are detail longitudinal sectional views illustrating different steps in the process of making a loaf of bread by means of our machine. Fig. 12 is a detail sectional view, enlarged, of part of the belt.

In the drawings, A represents the framework of the machine, in which are mounted two rollers B and B′, the shaft of one of which is provided with driving-pulleys $b$, which may be connected by a belt with any suitable source of power. A relatively broad belt C is mounted upon the rollers and is driven thereby. One of the rollers B′ is preferably mounted in movable bearings $b'$, which are adjustable by means of the screws $b''$, so that the tension of the belt may be regulated. We prefer that the belt should be of leather $c$, covered with canvas $c'$, the latter coming in contact with the dough, as we find that canvas is easy to keep clean, the dough does not stick to it, and it possesses a degree of roughness which gives to the belt the proper frictional engagement with the dough. Between the rollers the belt passes over a table or support D, which sustains the belt and keeps it in a uniform level plane while operating upon the dough.

Above the belt there is arranged an opposing surface, which is preferably in the form of a pressure board or plate E, between which and the belt the dough is carried. This pressure-board is preferably removable and provided with depending side flanges $e$, which may rest upon the framework A, as shown in Fig. 4. It is preferably adjustable toward and from the belt, to secure which adjusting-screws G or other forms of stops or adjusting devices may be used. These adjusting-screws are shown as being mounted in brackets carried by the pressure-board and bearing upon the top of the framework.

The pressure or resistance board should be held down or toward the belt with a yielding force, and to secure this any suitable form of spring-pressing device may be used. That which we have illustrated consists of a number of coiled springs $f$, arranged upon posts or pins $f'$ and between adjusting-nuts $f^2$ and brackets or projections $f^3$, carried by the pressure-board. By adjusting the nuts upon the posts $f'$ the tension of the springs may be varied and the pressure exerted upon the board E and through it upon the material, and the resistance which it offers to the forward movement of the material are correspondingly regulated. In practice the best results are accomplished when the pressure is less at the delivery end of the board than at the feed end.

We prefer that the belt while passing over the table D should have its edges C′ turned up at right angles to the main central portion thereof, and to accomplish this turning-rollers H are arranged at the feed end of the machine on either side of the belt. While the belt is passing under the pressure-board the edges C′ are held up by the flanges *e* of the pressure-board, along the inner sides of which the edges of the belt travel. When the belt is constructed of leather and canvas, as before described, the leather may be cut near the edges of the belt, as indicated at *c*″, Fig. 12, in order to facilitate turning up the edges C′.

Adjacent to the front end of the pressure-board E we arrange a yielding pressure device I, under which the dough must pass before it enters the space between the belt and the board E, and which operates to curl or fold over the advancing end of the mass of dough, and which from its function we term the "curler." It preferably consists of a comparatively narrow plate arranged centrally over the belt and pivotally supported near its rear end in supports I′, which hold its end sufficiently high above the belt C to allow the masses of dough which may be fed to the machine to enter freely under the plate.

A spring or springs J tend to force the end of the curler nearest to the board E toward the belt, the springs being preferably provided with tension-regulating devices *j*. As it is desirable that the edge of the curler should never come quite into contact with the belt, as that would tend to prevent the feeding of the dough and clog the machine, the curler is provided with a stop *i* to limit its downward movement, and it is also provided with another stop *i*′ to limit its upward movement, these two stop-pieces being arranged to engage with the board E, as clearly represented in Figs. 3, 8, and 9. The engagement of the curler I with the upper edge of the moving mass of dough operates to retard the movement of the part with which it comes in contact, while the lower portion of the mass which is engaged by the belt moves forward more freely, with the result that the dough is folded, thickened, rolled, or curled over at its front or advancing edge. To better secure this result, the under surface of the curler-plate—that with which the dough engages—is provided with a shoulder $i^2$, which is so shaped as to retard the upper part of the dough mass sufficiently to cause it to curl or fold over without, however, stopping the mass, which then enters the space between the belt and the pressure-board with a rolling motion, which is continued as the dough passes through the machine.

The dough may be fed by hand directly to the curler; but we prefer to arrange a pair of feeding-rollers K just in advance of the curler, one of these rollers being provided with flanges which overlap the ends of the other roller for the purpose of shaping the dough into a sheet of uniform thickness and width. These rollers may be driven in any suitable manner. We have shown driving-gearing M between them and the shaft of the roller B′.

A feed chute or board N is shown as leading to the rolls K.

The pressure-board may be variously shaped, according to the kind of bread and style of loaf desired to be produced. In the form of device shown in Figs. 1, 2, 3, and 4 the pressure device has a flat surface opposed to the belt and parallel therewith and of substantially the same width and with depending side flanges, this style of pressure-board being especially adapted for making the kind of bread known as "Vienna" bread.

In Fig. 5 is shown a form of pressure-board in which the inner operating-surface is curved and is only about one-half the width of the belt. This style of pressure device would operate to make the style of loaves known as "home-made."

The style of pressure-board shown in Fig. 6 is designed for making Vienna rolls and that in Fig. 7 for making round rolls or biscuits.

We will now describe the operation of the machine shown in Figs. 1 to 4. After the dough has come to the proper degree of age and lightness for being made into loaves it is weighed out into masses of a uniform size, and these are fed one at a time to the machine. The rolls K operate, as stated, to give to the irregular mass of dough a uniform width and thickness, the sheet as it issues from the rolls being preferably long, narrow, and thin. This sheet of dough passes directly under the curler, the shoulder $i^2$ of which momentarily retards the forward movement of the part of the sheet with which it engages, while the belt continues to carry forward the lower part of the sheet of dough. The forward edge of the dough sheet is thus curled or folded back on itself, and this is accomplished without tearing or breaking the skin of the dough, which is very important. As the dough escapes from the curler into the space between the presser and the belt it begins to roll into a mass and to spread out transversely across the belt, there being three movements imparted to the dough—viz., a slow progressive movement in the direction in which the belt is traveling, a rolling or folding of the dough upon itself on a line transverse to the belt, and a gradual elongating of the loaf as it approaches the rear end of the machine or until it acquires a length equal to the distance between the side edges of the belt. The progress of the dough through the machine results in a working and shaping of it into a loaf in a rapid and cleanly manner and as perfectly as can be done by hand.

Figure 8:
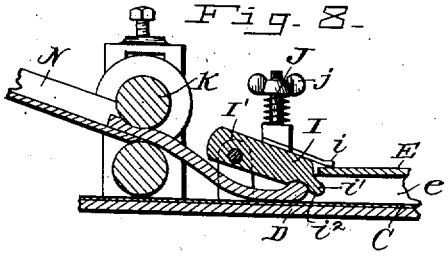
Figure 9:
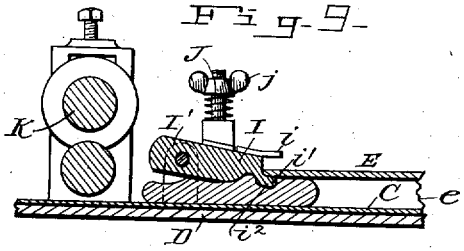
Figure 10:
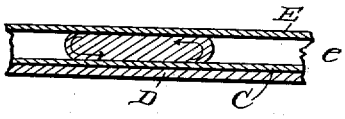

In Fig. 2 three masses of dough are represented in dotted lines as being operated upon. The first mass toward the feed end is shown as passing through the rollers K, under the presser or curler I, and into the space between the belt and pressure-board, where it begins to roll and spread out laterally. Figs. 8 and 9 show in cross-sectional views the dough in about the same position as the first mass of Fig. 2, Fig. 9 showing a slightly more advanced position than Fig. 8. The second or middle dough mass (represented in Figs. 2 and 10) is spread out transversely to about the required extent, but is not compacted and rolled or folded up into the nearly cylindrical shape which it should have as it emerges from the machine and which is represented in Fig. 11 and the third dough mass of Fig. 2.

It should be understood that we have not described every form of apparatus in which our invention may be embodied, only the preferred forms being shown. Many changes in the construction and arrangement of the parts will readily suggest themselves to those familiar with this art and as coming within the scope of our invention, and we wish to be understood that we do not mean to limit our invention to the particular apparatus shown and described. Thus the arrangement of the pressure board or device above the belt is not essential to the invention, but is the best and preferred arrangement. Likewise a stationary pressure-board is preferable to a movable one, such as a traveling belt, but it is not essential to the invention.

Some of the advantages of our invention would be retained in a machine without a curling or pressing device like that shown at I.

By making the traveling belt of a main central portion and two side portions arranged at substantially right angles to the main portion, the shape of the loaf being formed is much improved, as the side portions of the belt insure that the ends of the loaf shall be fed along at the same rate as the central part. While we prefer that the belt should be of one piece with its edges turned up to form the side portions C′, the same result would be accomplished by the use of a main horizontal belt and two independent vertically-disposed belts arranged at the edges of the main belt and traveling at the same speed. When a compound belt is used formed of two portions *c c′*, as herein described, the foundation may be of leather or equivalent material, such as rubber, and when we use the term "leather" in this case we mean to include by such term both leather and its equivalent.

We have found that the bread which is worked and shaped in a machine made according to our invention is of a more uniform grain or texture and is somewhat lighter in color than is bread which is worked by hand and is therefore superior to hand-made bread in these respects. We account for this from the fact that each loaf or mass of dough receives the same treatment, which insures uniformity and is more thoroughly worked and shaped than when worked by hand.

By the term "curler," as employed in this case, we refer to a device which effects a curling, rolling, or folding over or other thickening of the forward ends of the dough masses, which device is untimed in its operations relative to the other moving and operative parts of the apparatus, so that in operation it is always in position and ready to act upon the dough masses, whether they be delivered rapidly or slowly or at regular or irregular intervals. While we have illustrated in the drawings but one form or embodiment of a curler, we do not mean thereby to limit our invention to the specific mechanical device that we have shown for the purposes of illustrating an operative form of our invention, as the invention may be variously embodied without departing from the spirit of our invention as to the feature now under discussion, so long as the results as set forth are accomplished.

By the term "pressure-board" we refer to a means—whatever its particular shape or construction—which is arranged in combination with the means for advancing the dough masses, so that there is formed between them a passage in which the dough masses are worked, shaped, compacted, and molded. The sides of this passage are closed by side walls, which operate to prevent the dough loaves from being rolled out to an undesirable length, and in the form of our invention shown herein such side walls are formed by the flanges *e*.

The curling operation as carried out on a machine such as herein shown and described consists in the folding or doubling over or thickening of the forward portion of the dough mass, while the rear portion thereof is left flat, so that when the curled dough mass enters the working passage or space between the pressure-board and the means which feed forward the dough mass the thickened or curled portion is immediately and conjointly acted upon by the pressure board and the dough-advancing means, and is thereby thoroughly worked and shaped or molded into a loaf.

The complete machine or apparatus herein shown and described permits of its being very rapidly operated and that without the necessity of the parts being timed in their movements relative to each other, the curler, the belt, the pressure-board, and the sheeting-rollers being always ready to act upon the dough masses, whether they be delivered rapidly or slowly and at regular or irregular intervals of time.

What we claim, and desire to secure by Letters Patent, is—

1. The combination of a traveling belt, an opposing pressure-board provided with depending side flanges which are arranged adjacent to the belt and supports for said board, substantially as set forth.

2. The combination of a traveling belt, an opposing pressure board or device, provided with depending flanges at its sides, and a sustaining-table over which the belt moves, and upon which the side flanges of the pressure device are adapted to rest, substantially as set forth.

3. The combination of a traveling belt, an opposing pressure device, and a plurality of springs which hold the said pressure device toward the belt with a yielding force, and are arranged as described, whereby a greater pressure may be applied near one end of the belt than near the other, substantially as set forth.

4. The combination of a traveling belt, and an opposing spring-pressed pressure device, the pressure being less at the delivery than the feed end of the device, substantially as set forth.

5. In a machine for working dough, the combination of a traveling belt, an opposing pressure-board, the adjusting devices G, by which the pressure-board may be positively adjusted toward or away from the belt, the spring-pressing devices which hold the board toward the belt with a yielding force, substantially as set forth.

6. The combination of a traveling belt, an opposing pressure device, and a curler at the forward end of the latter, substantially as set forth.

7. The combination of a traveling belt, an opposing surface, and a curler provided with a retarding-shoulder which engages with the material as it is fed between the belt and said opposing surface, substantially as set forth.

8. The combination of the traveling belt, a curler, a pressing device arranged above the belt and in front of the curler, and a spring which holds the curler toward the belt, substantially as set forth.

9. In a bread working and shaping machine, the combination of a traveling belt, an opposing pressure or resistance board, a curler at the front end of the pressure-board, and a pair of dough-shaping rollers in front of the curler, substantially as set forth.

10. The combination of a traveling belt C, devices for turning up the edges of the belt, and for maintaining such edges substantially at right angles to the main central portion thereof, and an opposing pressure-board arranged opposite to and substantially parallel with the central portion of the belt, substantially as set forth.

11. In a machine adapted for the working and shaping of dough, the combination of means for advancing small masses or pieces of dough, a pressure-board, and a curler mounted on a fixed axis and having the portion thereof which engages with the material to curl it movable toward and from the path of the material, substantially as set forth.

12. In a machine adapted for the working and shaping of dough, the combination of means for advancing the masses of dough, a pressure-board between which and the said advancing means the material is worked and shaped, and a curler mounted on an axis fixed relative to the said advancing means, its operating-face being arranged in the path of the material and movable toward and away from such means around such axis, whereby it engages with the edge of the mass of material, curls it, and moves away from the advancing means, substantially as set forth.

13. In a machine adapted for the working and shaping of dough, the combination of means for advancing the masses of dough, a longitudinally-stationary pressure-board adapted to resist or oppose the free advance of the dough masses, and a curler situated on the same side of the path of the dough masses as is the pressure-board, substantially as set forth.

14. In a machine adapted for the working and shaping of dough, the combination of means for advancing the dough masses, a pressure board having a working face opposed to such means, side walls substantially perpendicular to the working face of the said advancing means, and situated at, and constituting the sides of, the passage between the advancing means and the pressure-board, and a curler substantially as set forth.

15. In a machine adapted for the working and shaping of dough, the combination of rollers for feeding and sheeting the pieces of dough, a means for advancing the sheeted pieces of dough, a pressure-board, and a curler arranged substantially as shown adjacent to the rollers and in such relation thereto that the forward end of a piece of dough passing between the rollers is engaged by the curler and curled before it entirely disengages the rollers, substantially as set forth.

16. In a machine adapted for the working of dough, the combination of means for advancing a thin mass or sheet of dough, a curler adapted to curl the forward portion of such dough mass and to permit the rear end or portion to pass in a flat or uncurled condition, and a pressure-board between which and the said advancing means the mass of dough is completely rolled up and compacted, substantially as set forth.

17. In a machine adapted for the working of dough, the combination of a constantly-moving means for advancing the dough mass, a pressure-board adapted to coact with such means to effect a working, compacting and shaping of the dough mass, and a movable curler situated normally in the path of the dough, and adapted to be moved thereby to effect the curling operation, substantially as set forth.

WILLIAM S. CORBY.
CHARLES I. CORBY.

Witnesses:
J. S. BARKER,
GEO. T. MAY, Jr.